N. P. STEVENS.
Bridle-Bit.

No. 159,527. Patented Feb. 9, 1875.

Witnesses.
S. W. Piper
L. N. Höller

Nathan P. Stevens.
by his attorney.
R. H. Eddy

UNITED STATES PATENT OFFICE.

NATHAN P. STEVENS, OF HOPKINTON, NEW HAMPSHIRE.

IMPROVEMENT IN BRIDLE-BITS.

Specification forming part of Letters Patent No. 159,527, dated February 9, 1875; application filed October 14, 1874.

*To all whom it may concern:*

Be it known that I, NATHAN P. STEVENS, of Hopkinton, of the county of Merrimack and State of New Hampshire, have invented a new and useful Improvement in Bridle-Bits; and do hereby declare the same to be fully described in the following specification and represented in the accompanying drawings, of which —

Figure 1:
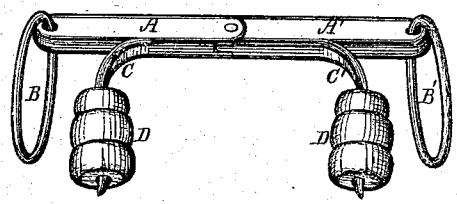
Figure 2:
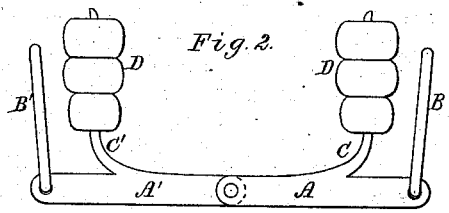
Figure 3:
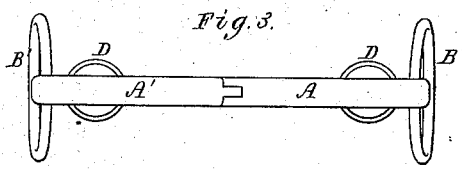

Figure 1 is a perspective view, Fig. 2 a top view, and Fig. 3 a front elevation, of a bit made in accordance with my invention.

In such drawings, A A' are two bars, hinged together at their inner ends, and provided at or near their outer ends with rings B B', which rings go through holes in said bars. From each bar, near its middle, there is extended backward one of two prongs or arms, C C', each having slipped on it or provided with one or more elastic balls or cushions, D, they being held to the prong or arm by any suitable means. The bit is what is termed a "snaffle-bit," the cushioned prongs or arms being additions to enable a driver or rider to effectually control a horse. When in use, the arms embrace the lower jaw of the animal, and, being drawn together thereon, compress it much as a rope or halter does when noosed around the jaw.

In practice, the bit, constructed as described, has been found to be highly effective, and not liable to injure a horse's jaw.

I do not claim a "snaffle-bit" provided with rigid prongs extended from its connected bars, all as shown in the United States Patent No. 11,083, dated June 13, 1854, and granted to Ebenezer N. Price.

In my bit I have the elastic tubular cushions D applied to the prongs C C', so as to encompass them on all sides and prevent them when in use from injuring the lip or jaw of the horse.

They not only do this, but, by extending around the outer sides of the prongs, they prevent the horse from injuring himself or his legs with either of the prongs when putting his head down to rub either leg, as a saddle-horse frequently will, especially in what is termed "fly-time."

I therefore claim—

In the jawed bit, the tubular cushions D D, combined and arranged with the prongs C C' of the hinged bars A A', all as shown and described.

NATHAN P. STEVENS.

Witnesses:
 WALTER S. DAVIS,
 STEPHEN S. KIMBALL.